(12) United States Patent
Nowak et al.

(10) Patent No.: US 9,499,122 B2
(45) Date of Patent: Nov. 22, 2016

(54) DEVICE FOR EMERGENCY CUTTING OFF FASTENED SEATBELTS

(71) Applicant: NOWAK INNOVATIONS SPÓLKA Z OGRANICZONA ODPOWIEDZIALNOŚCIA, Krosno (PL)

(72) Inventors: Wieslaw Nowak, Krosno (PL); Zygmunt Nowak, Krosno (PL); Janusz Nowak, Krosno (PL)

(73) Assignee: NOWAK INNOVATIONS SPÓLKA Z OGRANICZONA ODPOWIEDZIALNOSCIA, Krosno (PL)

( * ) Notice: Subject to any disclaimer, the term of this patent is extended or adjusted under 35 U.S.C. 154(b) by 0 days.

(21) Appl. No.: 14/345,911

(22) PCT Filed: Sep. 18, 2012

(86) PCT No.: PCT/PL2012/000094
§ 371 (c)(1),
(2) Date: Mar. 19, 2014

(87) PCT Pub. No.: WO2013/043066
PCT Pub. Date: Mar. 28, 2013

(65) Prior Publication Data
US 2014/0245873 A1     Sep. 4, 2014

(30) Foreign Application Priority Data
Sep. 19, 2011 (PL) .......................................... 396371

(51) Int. Cl.
*B60R 22/32* (2006.01)

(52) U.S. Cl.
CPC ............. *B60R 22/32* (2013.01); *B60R 22/322* (2013.01); *B60R 2022/327* (2013.01); *B60R 2022/328* (2013.01); *Y10T 83/8863* (2015.04)

(58) Field of Classification Search
USPC .............. 180/268; 280/801.1, 808; 83/639.1, 83/639.2, 639.3, 639.4, 639.5, 639.7
IPC ......... B60R 22/32,22/322, 2022/328, 2022/327
See application file for complete search history.

(56) References Cited

U.S. PATENT DOCUMENTS

| 7,717,216 | B2 * | 5/2010 | Van Rooyen ................. 180/268 |
| 7,941,902 | B1 * | 5/2011 | Roy et al. ........................ 24/602 |
| 2008/0116681 | A1 | 5/2008 | Van Rooyen | |

FOREIGN PATENT DOCUMENTS

| DE | 298 09 585 U1 | | 9/1998 |
| FR | 2 382 902 | | 10/1978 |
| FR | 2581944 A1 | * | 11/1986 |
| PL | 366686 | | 3/2009 |
| WO | WO 2006/109106 A1 | | 10/2006 |

* cited by examiner

Primary Examiner — Faye M Fleming
(74) Attorney, Agent, or Firm — Horst M. Kasper

(57) ABSTRACT

The fastened seatbelts cutting device for transport vehicle, especially automotive vehicles, featuring bushing-shaped housing with an explosive charge or a gas generator inside, the charge and generator connected with a system activating the belt cutting drive, also featuring a cutting knife and a slot for this knife or blade and a slot to house the belt being cut, has a pusher (6) located between the gas generator (4), chamber (3), and the cutting segment (7), sealed with respect to the working chamber (8) in the guide chamber (5), and the blade (9) cutting edge (21) is one of the sides of triangle connected with the blade (9) body seated in the cutting segment (7).

20 Claims, 14 Drawing Sheets

DEVICE FOR EMERGENCY CUTTING OFF FASTENED SEATBELTS

BACKGROUND OF THE INVENTION (1) Field of the Invention

The subject matter of this invention is the device for emergency cutting off fastened seatbelts in transport vehicles, especially automotive vehicles, the device having an elongated housing with an explosive charge or a pressure generator installed inside, connected with a system activating the drive of belt cutting, furnished with a cutting knife and a slot for that knife or a blade, and a gap for the seatbelt being cut in emergency if placed in the gap.

After an accident in which means of transport are involved drivers and passengers have difficulty in releasing from fastened seatbelts and leaving crashed vehicles, because of jammed seatbelt lock or not being able to have access to seatbelt lock, and because of after-accident shock, which especially refers to injured individuals, children, the disabled and the elderly. Fast leaving a vehicle by victims is very important as after such an accident there is a serious risk of fire of such a vehicle, the risk of being hit by other vehicles, or in a situation in which such a vehicle falls into water and sinks there is a serious threat to health and risk of fatality for individuals trapped in such a vehicle. Rescuing of injured passengers and a driver after accidents is always difficult because of fastened seatbelts.

(2) Description of the Related Art Including Information Disclosed Under 37 CFR 1.97 and 37 CFR 1.98

A method of emergency cutting off fastened seatbelts, known from the Polish patent application PL-366686A1, especially after an accident, fire or other occurrence which causes abrupt change of a vehicle position, consists in determining, by control devices, if the following facts occurred: seatbelts fastening status, accident occurrence, time elapsed from the accident occurrence, ceasing uncontrolled movement of vehicle, activating seatbelt tensioners or airbags, or starting fire, and then, transmission of these signals to a processor which, depending on the type of signal, causes automatic cutting off seatbelt straps by a moving blade powered with a pyrotechnic/explosive charge.

From the Polish patent application PL386089A1 a device for automating cutting off seatbelts is also known, the device whose body has a tubular element connected with its housing, and this element is furnished with an explosive charge located near its bottom and a moving cutting segment furnished with a blade, installed inside this element. The device housing has a rectangular go-through gap for that blade, which seen from its side has the shape of a right-angled triangle or an obtuse-angled triangle. It is favourable when the cutting blade of the device has the shape of a rectangular strip or a rhombus, or a trapeze, or an arch-shaped element. In another embodiment of this device, the cutting segment is a pressing mandrel, fitted movably in the tubular body and fitted under it a movable blade of a cutter, connected by an articulated joint with one end of a fixed arm of the housing. A longitudinal go-through gap is made in the housing arm opposite to the cutter blade, and the bottom end of a cylindrical mandrel has a shape of a truncated cone. An explosive charge is fitted over the upper end of this mandrel.

A German description of a utility model DE29809585U1 discloses a device for cutting off a seatbelt, the device being made up of a two-part housing, one part of the two, attached to a transverse element of car body, is furnished with a fixed knife and the other part is furnished with a moving knife and an initiating set placed over h, driving the knife furnished with an initiator. Both parts, placed opposite each other, are furnished with rolls guiding the hip belt and the arm belt. After an airbag goes off, a delayed initiating impulse is given to the initiator and the latter initiates, in turn, the driving set, which causes the movement of the moving knife towards the fixed knife, and both seatbelts get cut off along the matching line of those two knives.

An international patent application WO2006/109 106 A1 also discloses a device for quick releasing from fastened seatbelts, the device having a rectangular hollowed housing, furnished with an element attaching the flat section of a seatbelt and with a cutting element powered with an explosive element, having three controlling devices, and the cutting element has also a moving part with a blade directed towards the straight section of the seatbelt. The moving element having adequate inertial mass is situated in two guides attached to a support of the housing. Two out of three devices controlling the element, which actuates the cutting element, are actuated by hand and the other inertial element is actuated automatically, and one of the hand-operated controlling devices co-works with the removable device blocking the movable blade element. An explosive, flexible actuating devices, pushes the movable blade element towards the blocking element and shifts the movable element to its second position. Besides, an attaching element contains two locking elements positioned on both sides of the housing to keep a section of the seat belt straight, pressed between two walls of the housing and the fixing element. The housing has also an oblong gap inside and side walls. The moving element with a blade slides along the mentioned guides limited with the side walls of the housing, and the movable blade shins in the gap in the housing, powered by its moving element of appropriate inertial mass.

A French patent description FR2382902 proposes a device for cutting off the seatbelts, the device being made up of a cutting device, a device holding this cutting device in appropriate proximity to the belt being cut, a device storing energy necessary to cut this belt, a device sending a signal to activate the device storing energy, a sensing device connected with the energy storing device, the energy being adjusted to an abnormal situation, and the device being furnished with a pin pushing device located in an opening and a pusher with a bent spring pushing the mentioned pin along this opening towards the energy storing device. The spring device in tensioned position is held by a readily fusible wire which gets broken in response to activation of the sensing device, signalling an abnormal situation occurring, and the same causing the spring release and, in turn, activating the movement of the pusher pin. The aforementioned energy storing device is furnished with a chemical drive in the form of a blank cartridge, while the cutting device is made up of a blade and an anvil device between which the seatbelt runs. The cutting blade is fixed on a piston held in the opening of the holding device. The sensing device, on starting an abnormal condition, connects a source of electric current with this readily fusible wire melting it, and as a result the blank cartridge explodes and the piston with the blade is pushed outside and cuts the safety belt.

Patent description US 2008/0116681A1 discloses a device activated by an electronic control system to cut off the seatbelts. The seatbelt cut-off device comprises a seatbelt guillotine unit, a line for supplying pressurized gas from a gas cartridge to the guillotine unit, a cutter holder and a small cartridge cutter used to slice a gas cartridge membrane, a pressurized gas cartridge with a nozzle having a membrane preventing pressurized gas from releasing, a solenoid with a mounting bracket and a housing, and a striker pin used to push the pressurized gas cartridge.

The seatbelt cut-off device has a U-shaped housing fastened with screws, a double-sided blade—a V-shaped guillotine unit, connected with a piston shaft where a spring is located in order to prevent an inadvertent move of the piston shaft and cutting blade. The cut-off device has a webbing slot located perpendicularly to the cutting blade and the seatbelt is to be cut simultaneously by the two sides of the guillotine blade from the centre of the belt towards its sides. In this solution, following an accident, the solenoid is energized and moves the striker pin which pushes the pressurized gas cartridge. The pressurized gas cartridge, in turn, hits its nozzle on the small cuter which slices the membrane and releases pressurized gas which drives the double-sided cutting blade of the guillotine unit, which is to cut off the seatbelt.

The aforementioned solution is a complex and extended design comprising many parts. It takes a lot of space which limits its applicability in e.g. passenger cars. The design of the seatbelt cut-off device is not suitable for cutting off the seatbelt webbing used in means of transport. It is only a seemingly functional seatbelt cut-off device, because in this way it is not possible to cut off the seatbelt webbing used in the automotive industry. This is because perpendicular operation of a double-sided cutting blade or guillotine unit is unable to slice through flexible polyester fibres used in the seatbelt webbing all over the world according to UNECE Regulation No. 16 on international safety standards for automotive safety-belts.

All these features make the seatbelt cut-off device expensive and complex, which limits its applicability as an emergency device used in exceptional situations only.

The essential drawback of the seatbelt cutting design solutions known so far is that the flame caused by the pressure and resulting hot gases from burnt explosive charges are noxious for people remaining in the after-accident motor vehicle which, in turn, poses a risk of fire inside the vehicle cabin. Besides, most of known devices have sophisticated design, which has a negative impact on long-term efficiency and applicability in automotive vehicles. Furthermore, the sophisticated design requires specialized manufacture process engineering, which considerably increases the production costs.

BRIEF SUMMARY OF THE INVENTION

The objective of the invention is to eliminate the drawbacks and inconveniences found in the seatbelt cutting devices known so far.

This objective was attained in the solution proposed invention in which a fastened seatbelt cutting device in transport vehicles, especially automotive vehicles, has an elongated housing with a pressure or a gas generator inside, connected to a system activating a drive for belt cutting. The proposed belt cutter is furnished with a cutting knife or blade, a slot for that blade, and a gap for the seatbelt being cut to be placed in it. The belt cutter has a pusher located between the pressure generator and a cutting segment, the pusher being air-tight sealed in a guiding chamber relative to a work chamber, and a mass of a cylindrical cutting mandrel in the cutting segment is adjusted to the rated power of a pressure generating explosive charge. A cutting edge of the blade is embedded in a cutting segment. The device has a gasket (a sealing ring) placed on the pusher which forms a separate part relative to the cutting segment. Another gasket is placed in the guiding chamber at its stop face, preventing inadvertent move-out of the cutting segment towards the belt.

In another embodiment of the device for cutting off the fastened seatbelts, a first gasket is placed on a cylindrical mandrel of the cutting segment and other gasket is placed in the guiding chamber at its stop face, preventing inadvertent move-out of the cutting segment towards the belt. The cutting segment is longer than the work chamber.

In another embodiment of the invention a gasket is placed on the cylindrical mandrel of the cutting segment on its end part towards the pressure generator and moves along with it in the operational direction of work of the cutting segment. Here also the cutting segment is longer than the work chamber.

In the proposed device the top point of the cutting edge of the blade embedded in the cutting segment is the point of the blade closest to the belt being cut.

In another variant of the device the top point of the cutting edge of the blade embedded in the cutting segment is the point of the blade closest to the pressure generator.

Use of the pusher with its additional sealing or of the pusher and the air-tight cutting segment prevents from any risk of fire due to release of hot gases, smoke and flame, being the products of combustion of the pressure generator, to the outside of the device through the gaps for the belt and in the cutting segment, the products of combustion being noxious for people remaining in the damaged motor vehicle.

In the device according to the invention, application of the system composed of the elements functionally linked one with another, and installed in the elongated housing of the device, between the pressure generator and the seatbelt cutting segment, results in a reliable device for cutting seatbelt straps, conforming to international UN safety standards for pyrotechnic devices used in means of transport. Such a design makes possible to reduce and substantially simplify its construction and therefore to develop a simple and compact device of a small size. A very important aspect of this design is reduced number of elements of the seatbelt straps cutting-off device, because it minimizes the risk of failure when the device stays inactive for many years. It also lowers the production costs.

BRIEF DESCRIPTION OF THE SEVERAL VIEWS OF THE DRAWINGS

An example of the device embodiment is presented in the drawings,

FIG. 5 showing its cross section A-A from FIG. 4a;

DETAILED DESCRIPTION OF THE INVENTION

Figure 1:
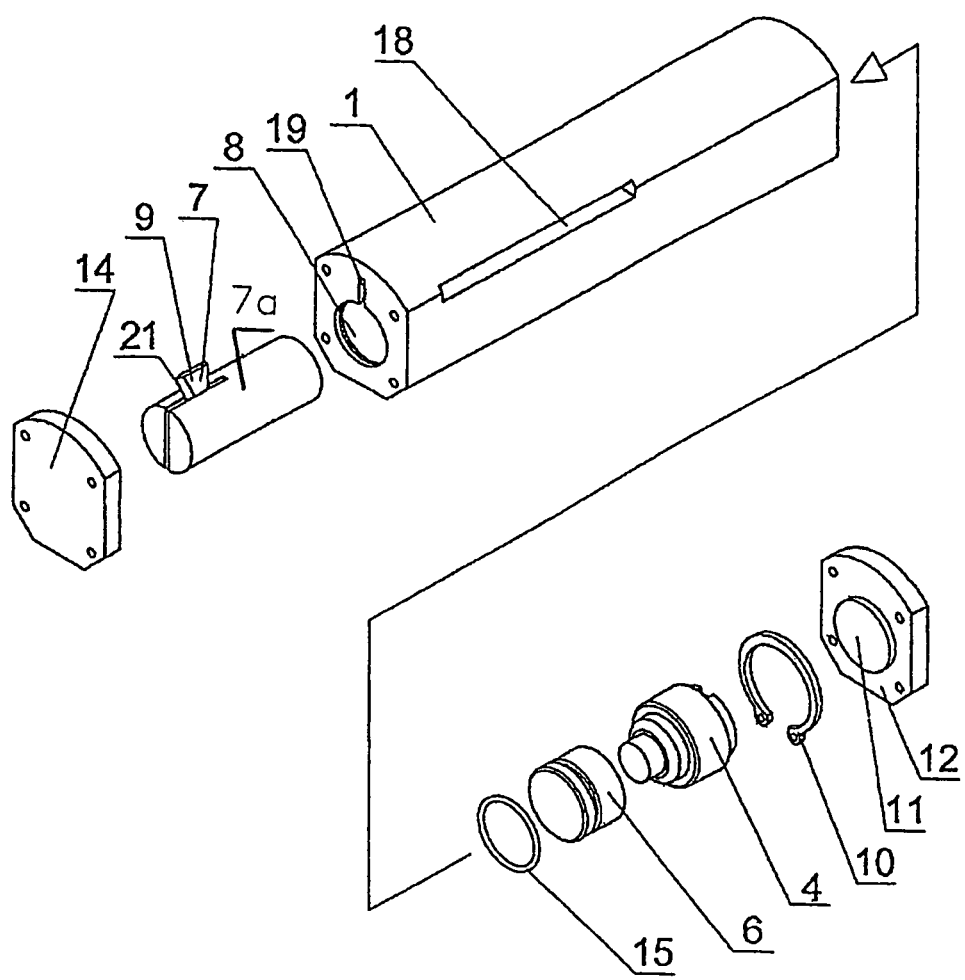
FIG. 1 showing the automatic seatbelt cutting device in exploded perspective view, with the short cutting element and the pusher.
Figure 2:
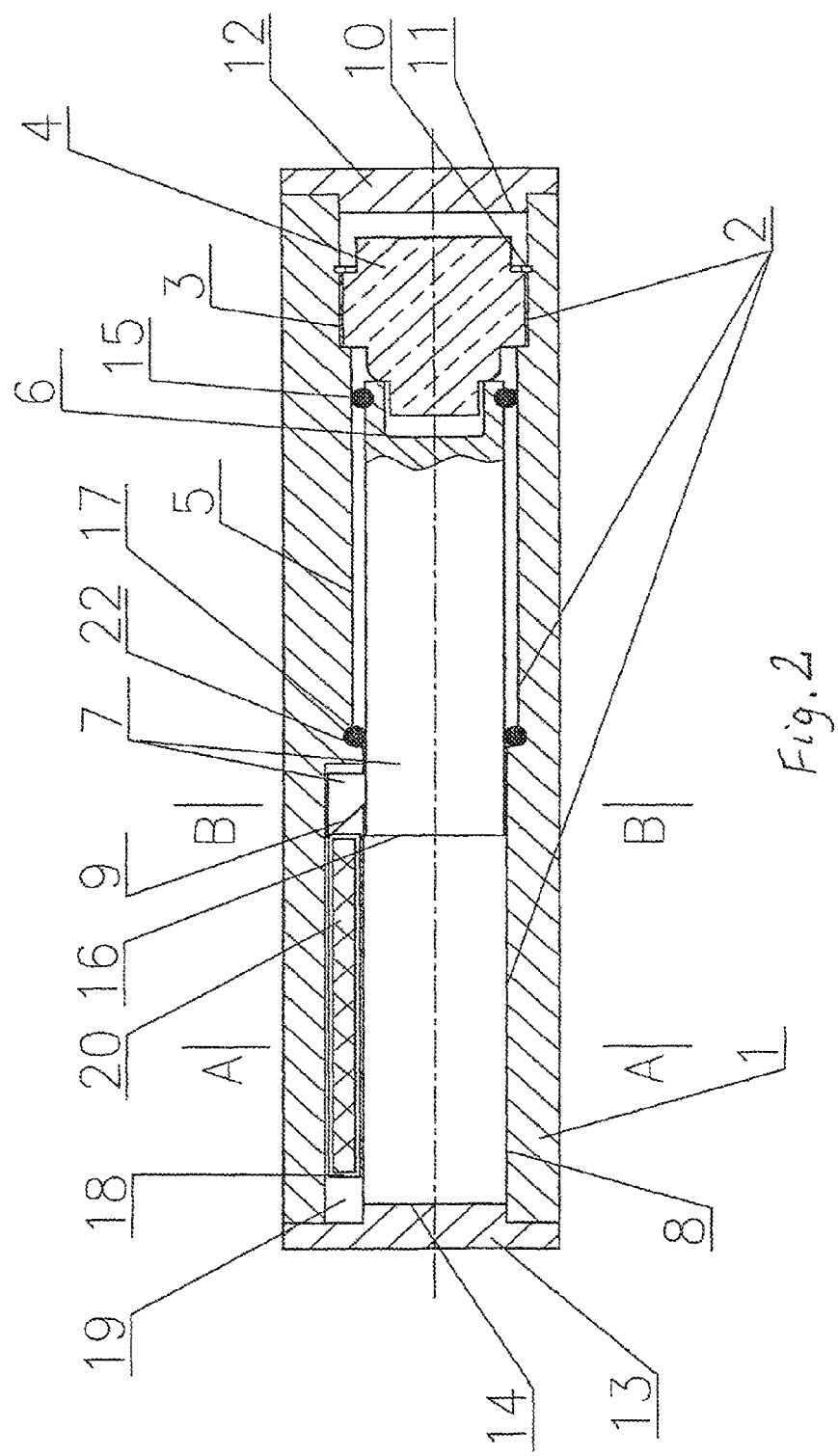
FIG. 2 showing the same device in longitudinal section.
Figure 2A:
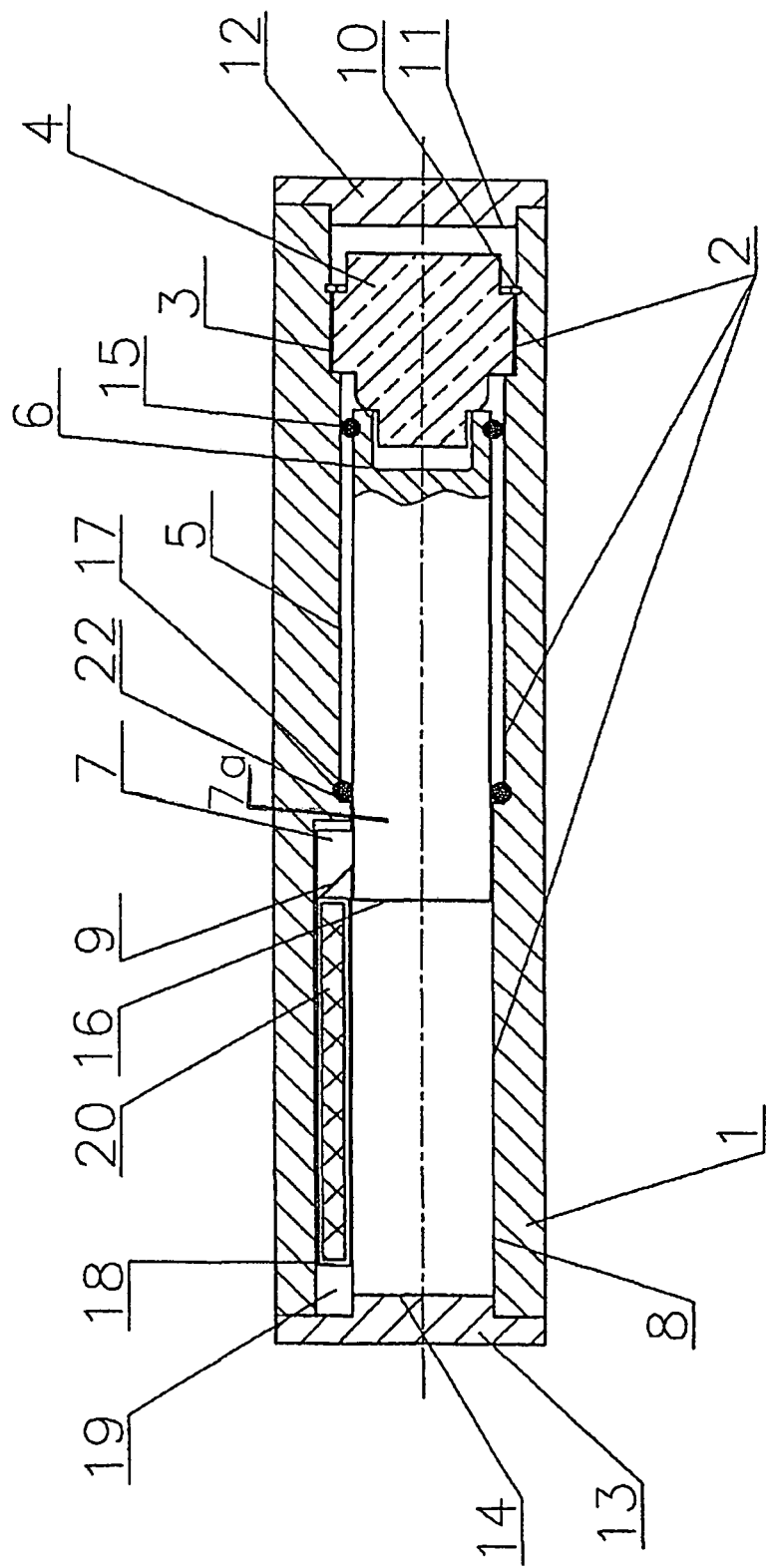
FIG. 2a and FIG. 2Aa showing the automatic seatbelt cutting device in longitudinal section before it begins cutting, FIGS. 2b and 2Ab showing the same device in longitudinal section as it cuts through the seatbelt, and FIGS. 2c and 2Ac showing the same device in longitudinal section after it has cut the seatbelt.
Figure 2B:
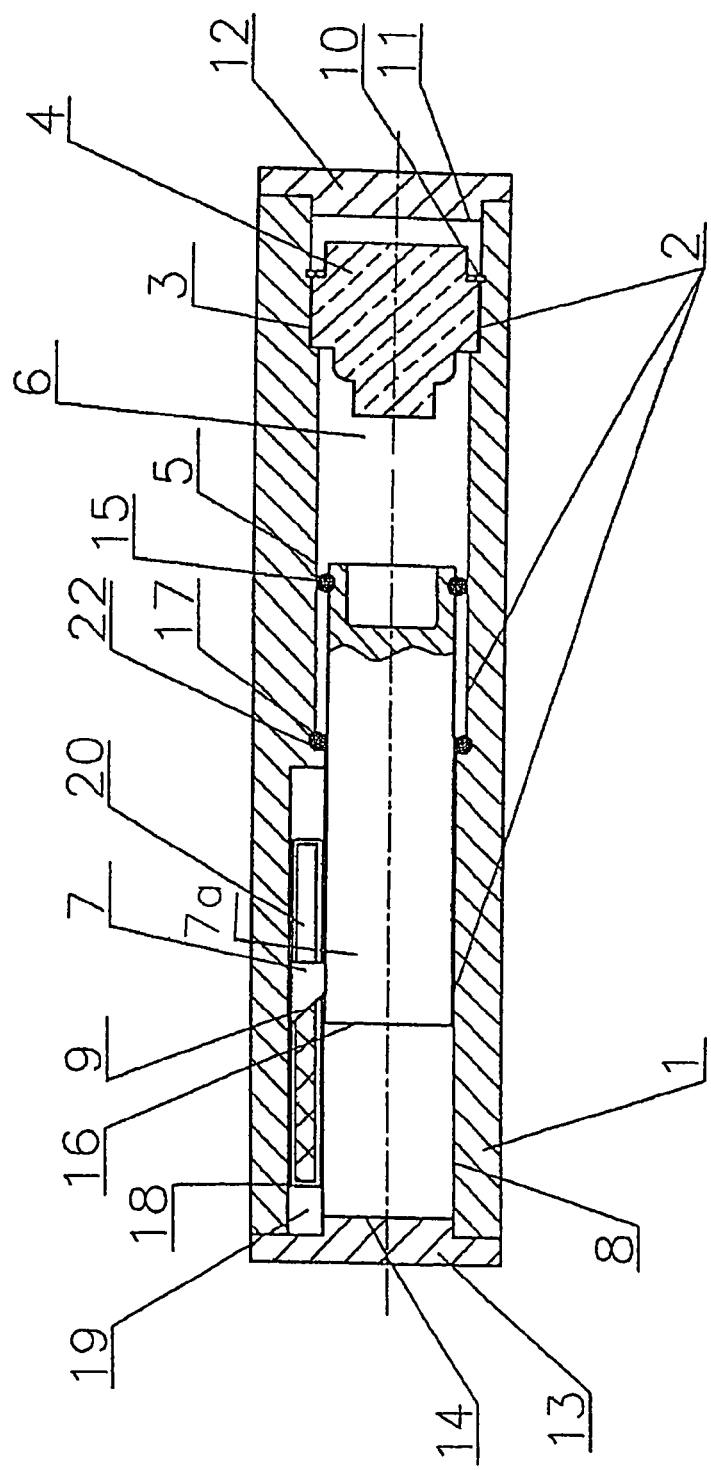
Figure 2C:
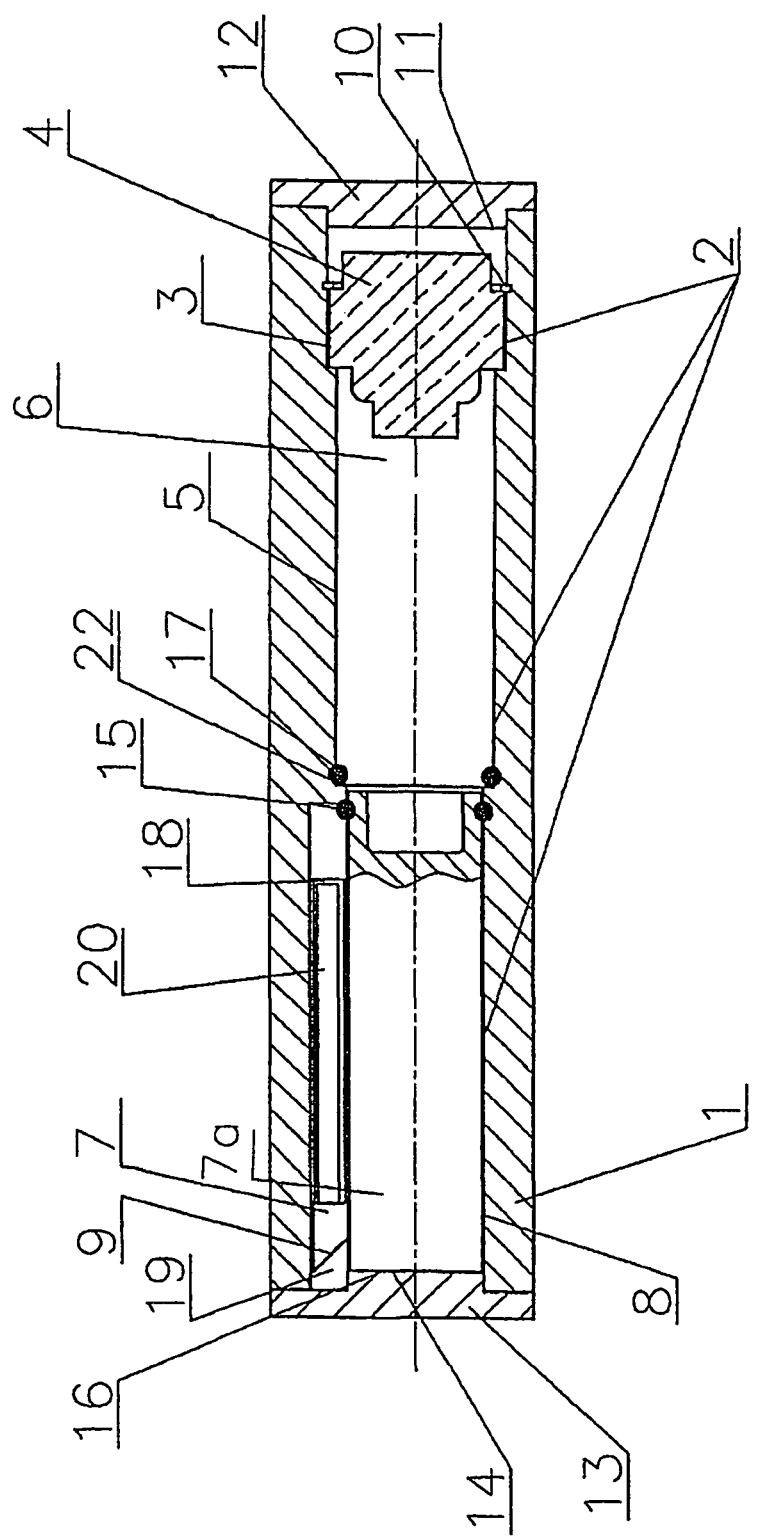
Figure 2A:
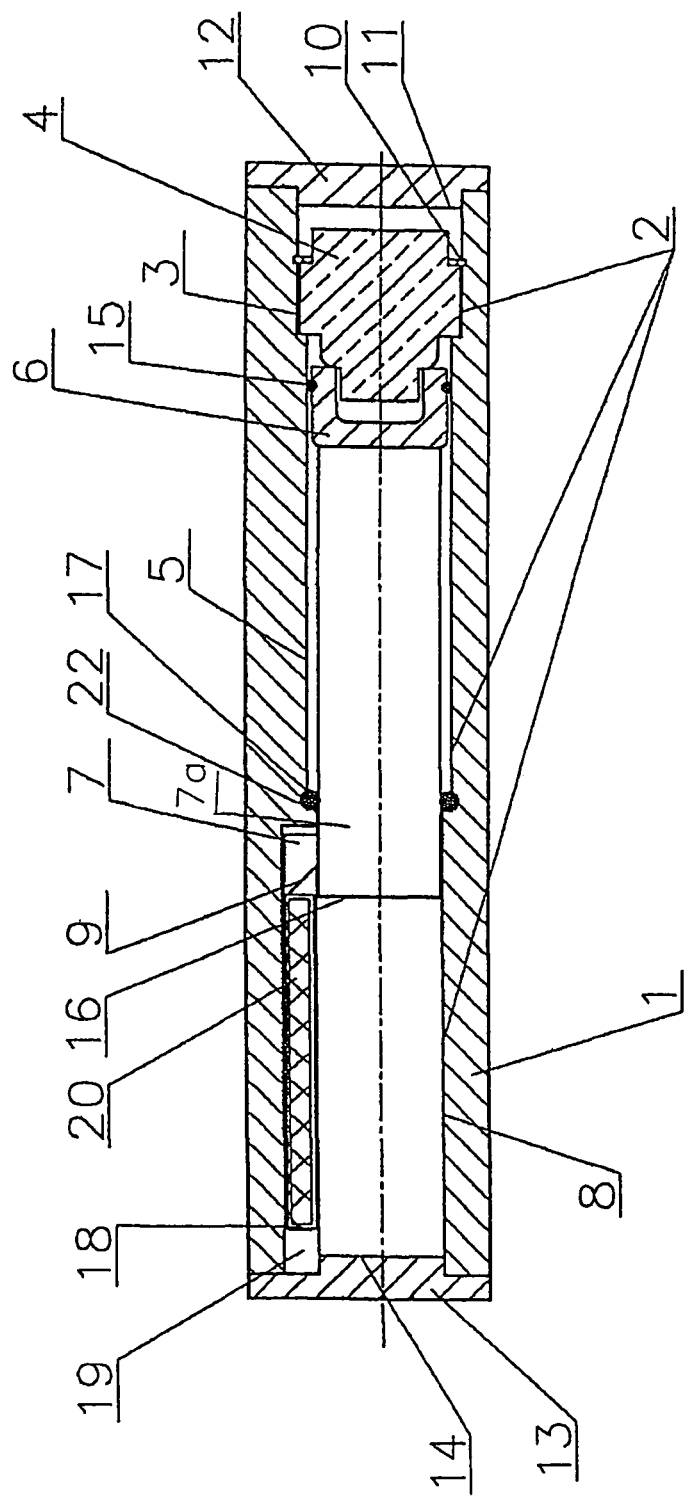
Figure 2A:
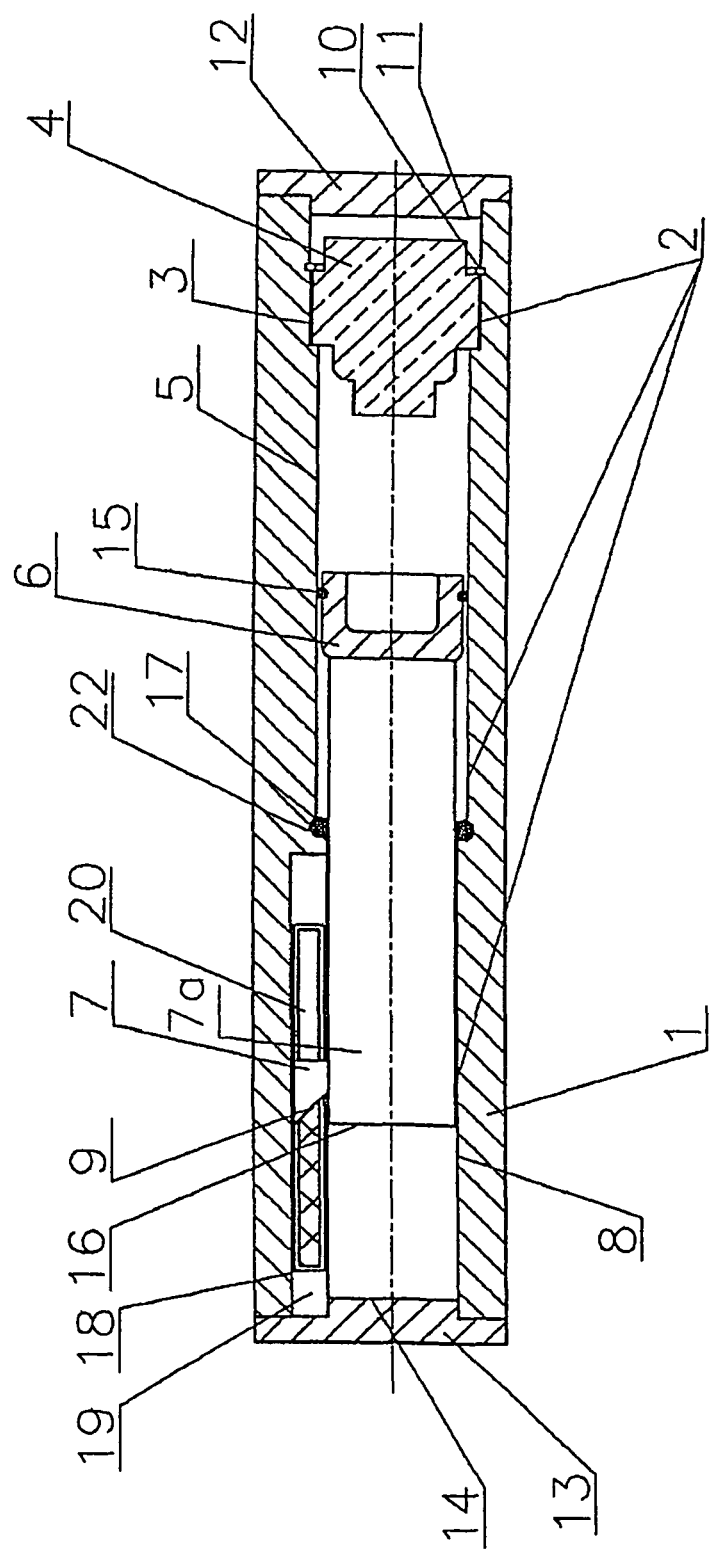
Figure 2A:
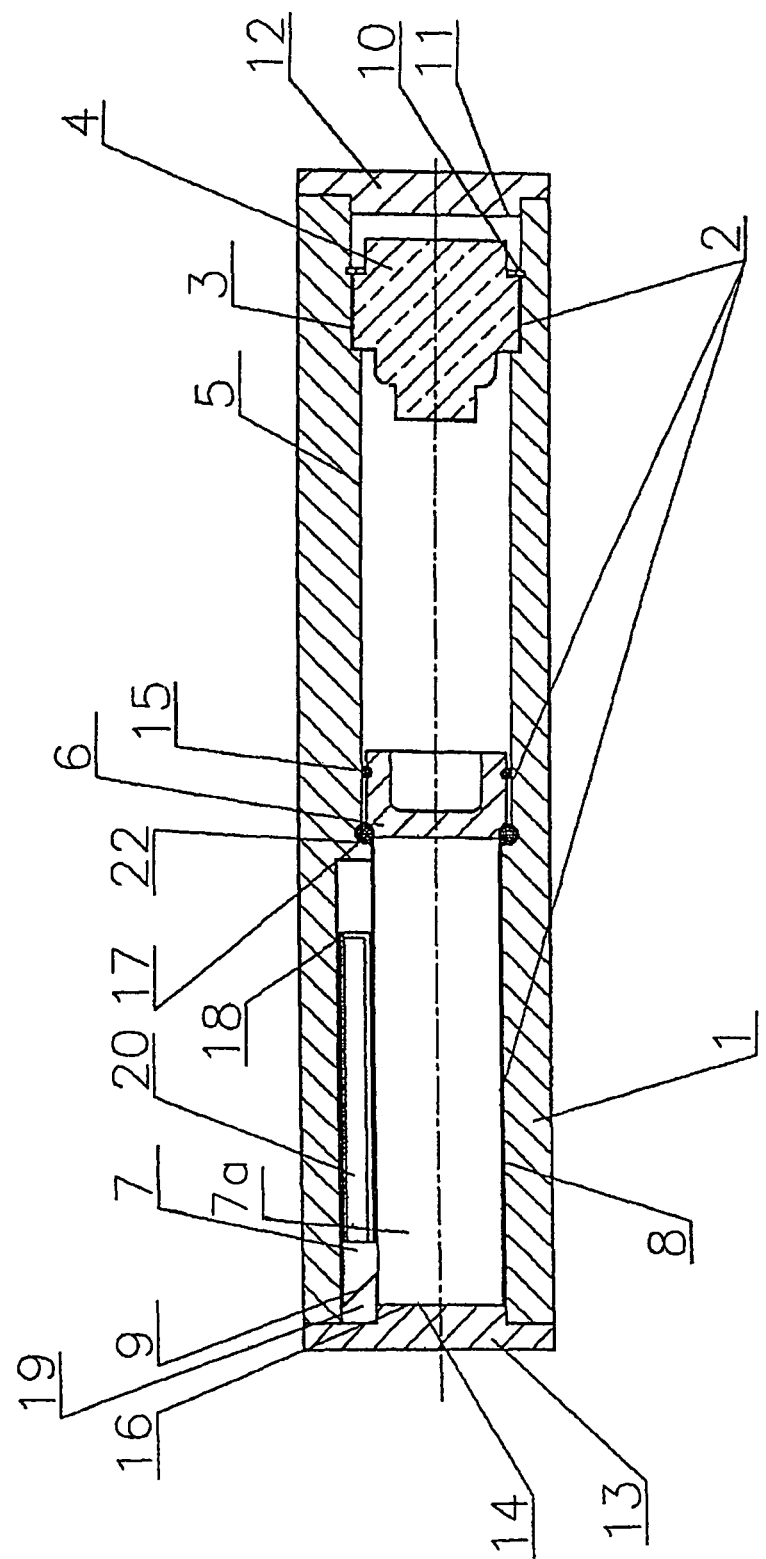
Figure 3:
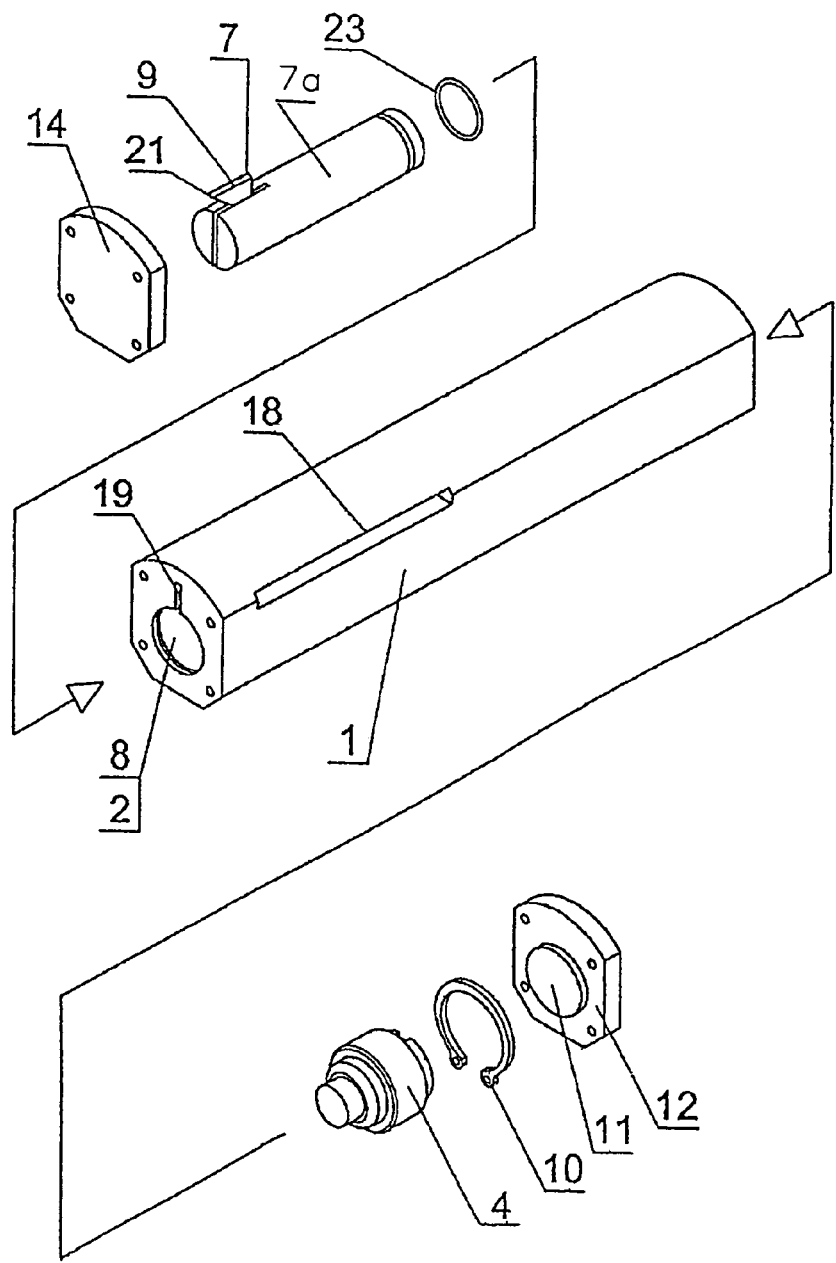
FIG. 3 showing the automatic seatbelt cutting device in exploded perspective view, with the movable long cutting element with sealing in its end part.
Figure 4A:
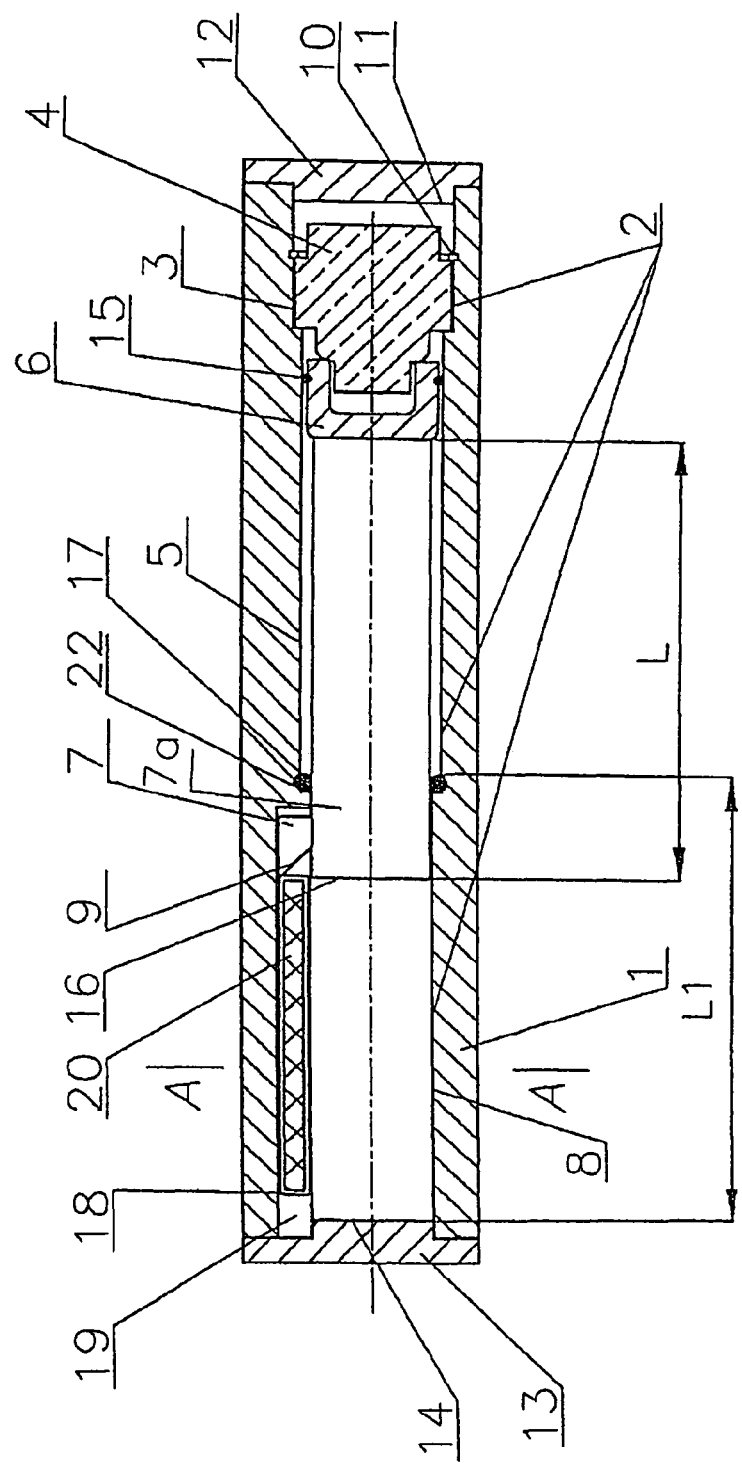
FIG. 4a showing the same device in longitudinal section.
Figure 5:
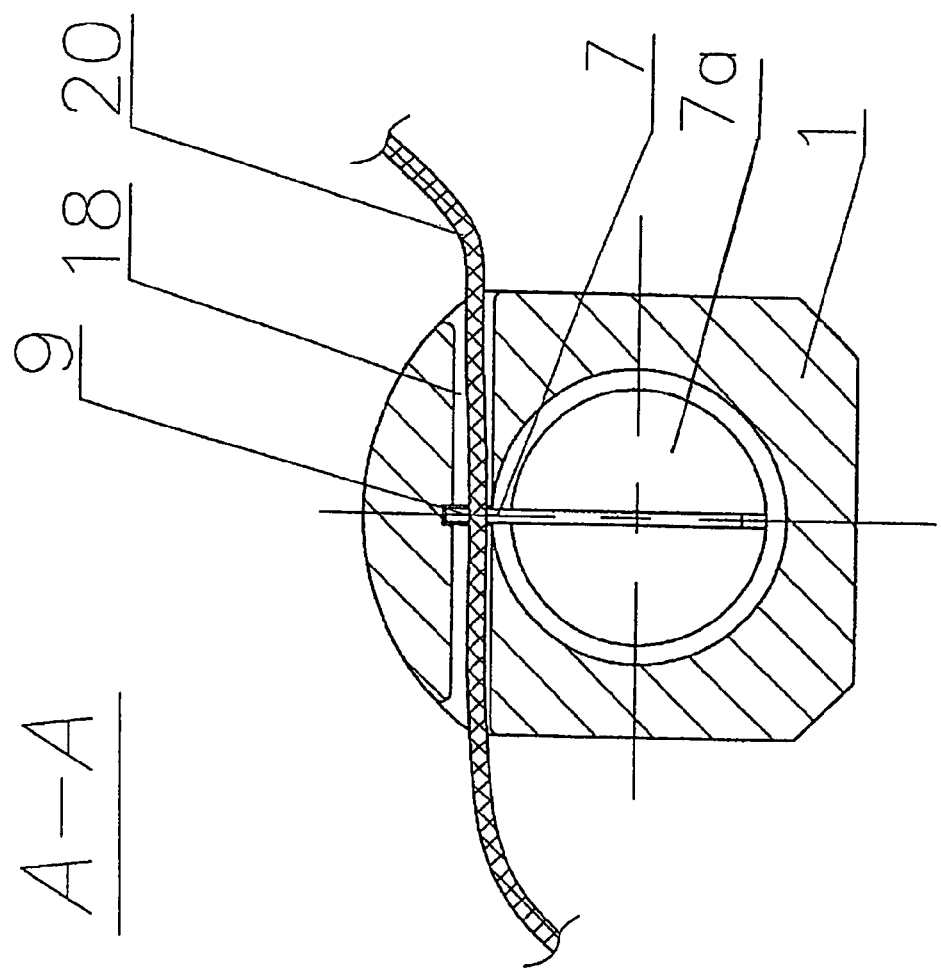
Figure 6:
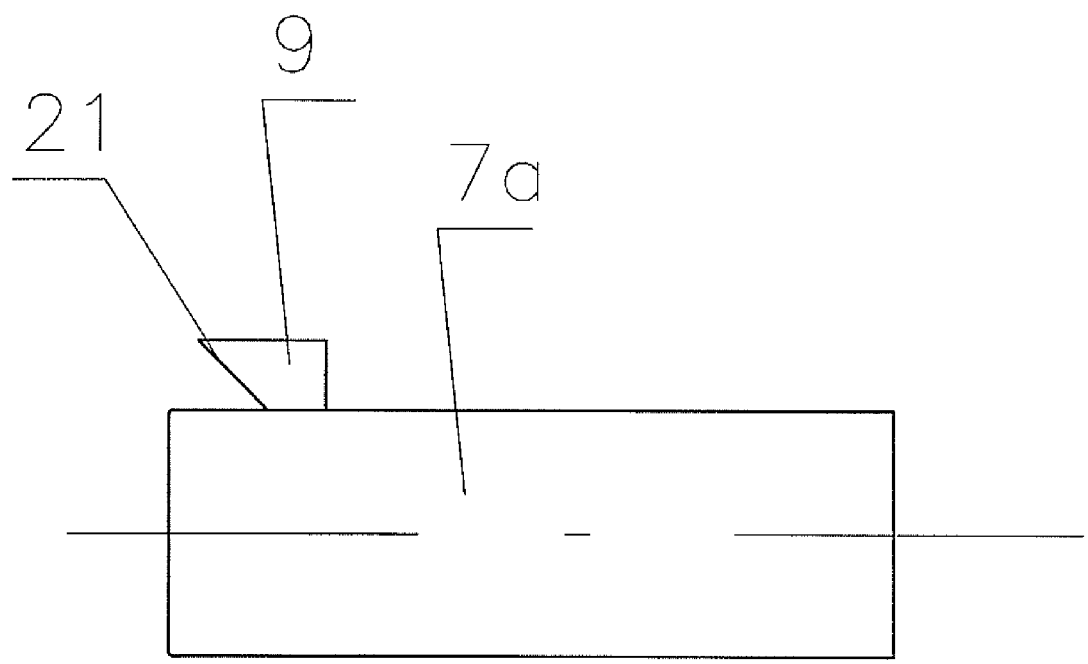
FIG. 6 showing the side view of the cutting segment with the top of the cutting edge protruded towards the belt being cut.
Figure 6A:
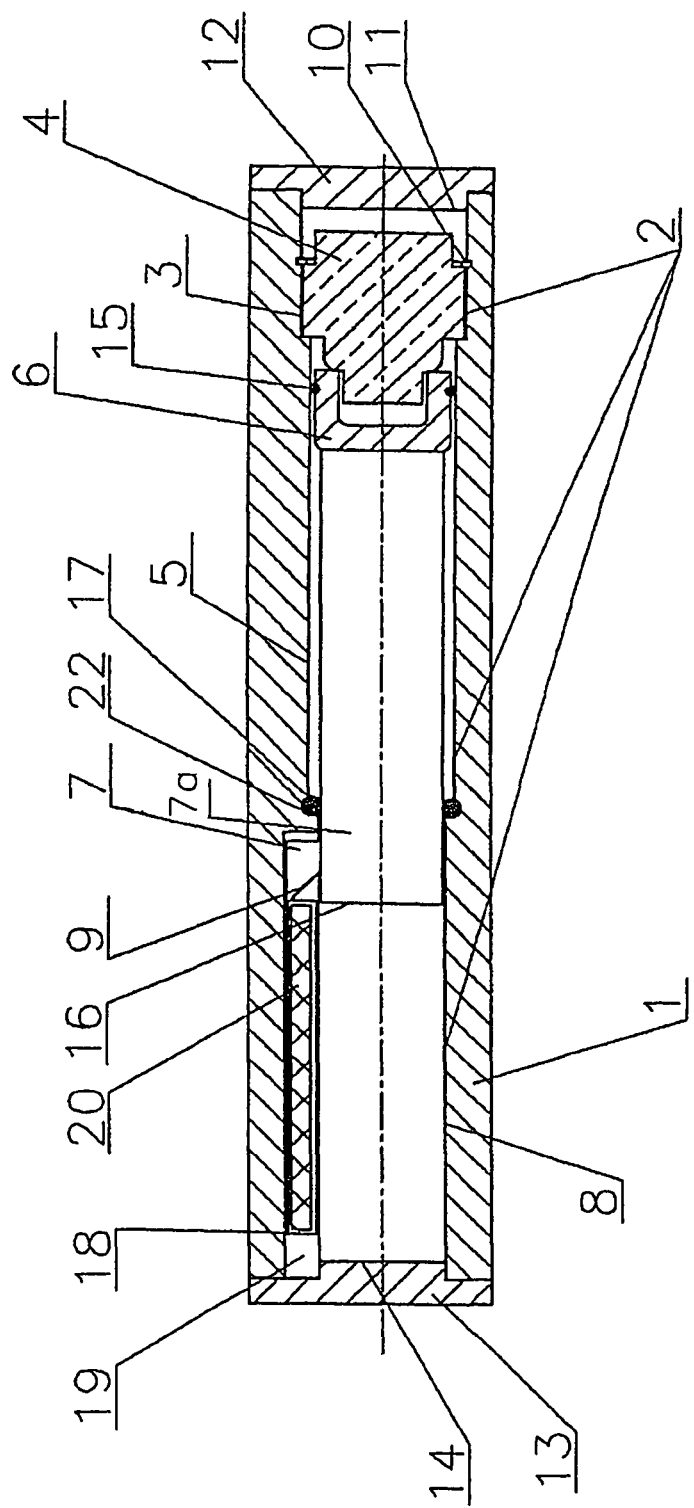
FIG. 6Aa showing a side view of the cutting segment with the top of the cutting edge protruded towards the belt being cut.
Figure 7:
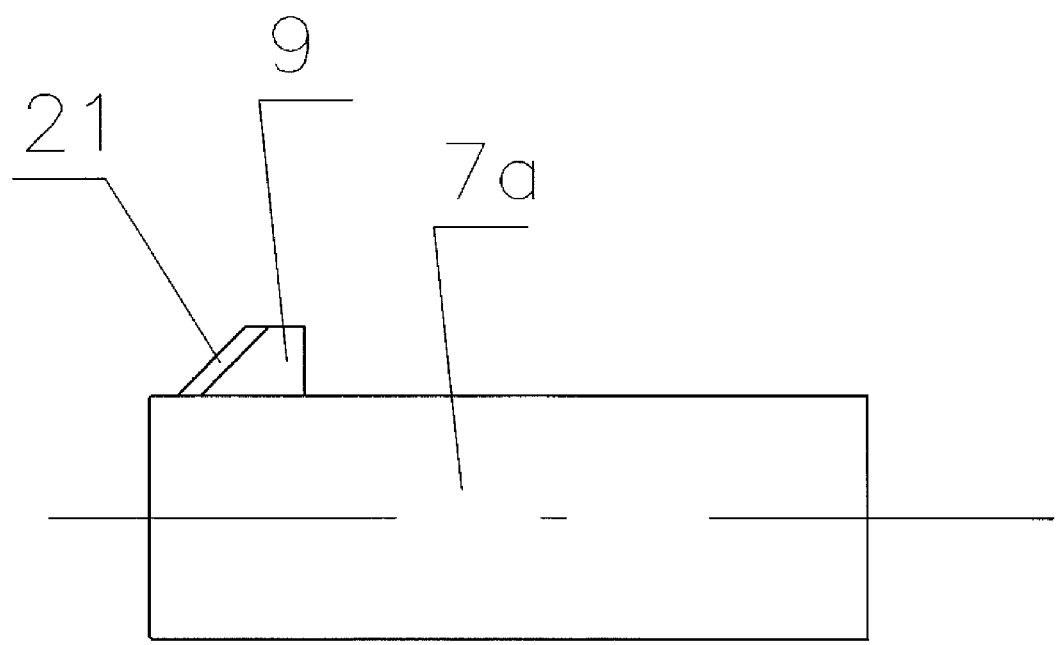
FIG. 7 showing a side view of the cutting segment with the top of the cutting edge withdrawn towards the pressure generator.

The device for automatic cutting off fastened seatbelts in transport vehicles, comprises an elongated housing 1 with an elongated opening 2 made up of three chambers, first chamber 3 for a pressure generator 4, second guiding chamber 5 for guiding a cylindrical mandrel 7a of a cutting segment 7 and a pusher 6, and third chamber, work chamber 8, for move of the cutting segment 7. The pressure generator 4 has terminals with "+" and "−" poles to connect electric leads, supplying electric current from a source, not shown in the figure, installed in an automotive vehicle. At time of an accident, an electric signal activating, for example, the vehicle's airbag, or a different electric signal is supplied to the electronic system activating the drive of the seatbelt cutting-off device which, after some delay required to stop the vehicle movement, activates the pressure generator 4. A mounting resilient ring 10 is installed in the first chamber 3 of the elongated opening 2 and the ring protects the pressure generator 4. The first chamber 3 behind the pressure generator 4 has its face closed with a rear cap 12 with a rear cap protrusion 11 entering this chamber. Shock wave pressure generated by the pressure generator 4 causes pressing exerted on the face of the cutting segment Thy the pusher 6, resulting in their shift in the elongated opening 2 towards the work chamber 8. During this shift, the face 16 of the cylindrical cutting segment 7 moves the cutting blade 9 with a cutting edge 21 in a rectangular blade slot 19 in the elongated housing 1, effecting in immediate cutting of the seatbelt 20 situated in a rectangular belt gap 18. After cutting off the fastened seatbelt 20, the first sealing ring 15, embedded on the pusher 6, rests against the second sealing ring 17, placed directly at the stop face 22 of the guiding chamber 5, causing total tight-sealing of work chamber 8 with the go-through belt gap 18 and the blade slot 19, thus preventing from undesirable penetration of the smoke and/or flame caused by the pressure generator 4. In the second embodiment, without the second sealing ring 17, the first sealing ring 15, after cutting the belt 20, rests directly against the stop face 22. On activation of the pressure generator 4, the cutting segment 7 along with the cutting blade 9 will shift so that its face 16 will rest against the front cap protrusion 14 of the front cap 13 which closes the work chamber 8.

In the device without the pusher 6, an elongated cutting mandrel 7a was used, to make the length "L" of the cutting segment 7 longer than the length "L1" of the work chamber 8.

Described above configuration of the fastened seatbelt cutting device the belts in both tensed and lax position. The invented device may be applied in various means of transport furnished with seatbelts such as a vehicle, a hovercraft, an aircraft, operational machinery, and others.

LIST OF THE REFERENCE NUMERALS 1 elongated housing
2 opening
3 first chamber
4 pressure generator
5 guiding chamber
6 pusher
7 cutting segment
7a mandrel
8 work chamber
9 blade
10 ring
11 cylindrical protrusion
12 plug
13 cover
14 protrusion
15 first sealing ring
16 face
17 second sealing ring
18 rectangular belt gap
19 blade slot
20 belt
21 cutting edge
22 stop face
23 third sealing ring

The invention claimed is:

1. A device for emergency cutting off fastened seatbelts in transport vehicle or automotive vehicles, the device having a tubular housing with an explosive charge or a gas generator installed inside, connected with a system activating a drive of belt cutting, furnished with a cutting knife and a gap for the knife or a blade and a gap for the seatbelt being cut to be placed in it, wherein
   a pusher (6) is situated between the gas generator (4) and a cutting segment (7), tight-sealed relative to a work chamber (8) in a guiding chamber (5), and the mass of a cylindrical cutting mandrel (7a) of the cutting segment (7) is adjusted to the power of a gas generator (4) charge, and a cutting edge (21) of the blade (9) is one of the sides of a triangle connected with a body of the blade (9) embedded in the cutting segment (7), wherein
      a first sealing ring (15) is placed on the pusher (6), being a separate part from the cutting segment (7) and a second sealing ring (17) is placed in the guiding chamber (5) at its stop face (22), to prevent inadvertent moving out of the cutting segment (7) towards the belt (20).

2. A device for emergency cutting off fastened seatbelts in transport vehicles, or automotive vehicles, the device having a tubular housing with an explosive charge or a gas generator installed inside, connected with a system activating a drive of belt cutting, furnished with a cutting knife and a gap for the knife or a blade and a gap for the seatbelt being cut to be placed in it, wherein
   an extended cylindrical mandrel (7a) is situated following the gas generator (4) in a cutting segment (7), wherein the extended cylindrical mandrel (7a) constitutes an extension of this cutting segment (7) in the direction of a chamber (3), tight-sealed relative to a work chamber (8) in a guiding chamber (5), and a cutting edge (21) of the blade (9) is one of the sides of a triangle connected with a body of the blade (9) embedded in the cutting segment (7), wherein
      a first sealing ring (15) is placed on the cylindrical mandrel (7a) of the cutting segment (7) and a second sealing ring (17) is placed in the guiding chamber (5) at a stop face (22), to prevent inadvertent moving out of the cutting segment (7) towards the belt (20) and the length (L) of the cutting segment (7) is greater than the length (L1) of the work chamber (8).

3. A device for emergency cutting off fastened seatbelts in transport vehicles, or automotive vehicles, the device having a tubular housing with an explosive charge or a gas generator installed inside, connected with a system activating a drive of belt cutting, furnished with a cutting knife and a gap for the knife or a blade and a gap for the seatbelt being cut to be placed in it, wherein an extended cylindrical mandrel (7a) is situated following the gas generator (4) in a cutting segment (7), and the extended cylindrical mandrel (7a) constitutes an extension of this cutting segment (7) in the direction of the chamber (3), tight-sealed relative to a work chamber (8) in a guiding chamber (5), and a cutting edge (21) of the blade (9) is one of the sides of a triangle connected with a body of the blade (9) embedded in the cutting segment (7) wherein a sealing ring (15) is placed on the cylindrical mandrel (7a) of the cutting segment (7) in its end part from the side of the gas generator (4) and moves along with it in the work direction of the cutting segment (7) and the length (L) of the cutting segment (7) is greater than the length (L1) of the work chamber (8).

4. A belt cutter for emergency automatic cutting of seatbelts in vehicles, comprising an elongated housing (1);

a pressure generator (4) disposed in the elongated housing;

an activating system connected to the pressure generator (4);

a blade (9) having a cutting edge (21) fixed in a mandrel (7a) of a cutting segment (7) and movable along a blade slot (19) in the elongated housing (1);

a pusher (6) placed between the pressure generator (4) and the cutting segment (7), and a belt gap (18) disposed in the elongated housing (1);

a central axis common to the elongated housing (1), the pusher (6) and the mandrel (7a) of the cutting segment (7) and disposed parallel to a plane of the blade slot (19), and to a plane of the belt gap (18), and wherein that the blade slot (19) and the belt gap (18) intersect along a cutting line.

5. The belt cutter according to claim 4, wherein the plane of the blade slot (19) is disposed perpendicular to the plane of the belt gap (18).

6. The belt cutter according to claim 5, further comprising
a first chamber (3), wherein the pressure generator (4) is disposed fixed in the first chamber (3);
a guiding chamber (5), wherein the pusher (6) is movable along the guiding chamber (5);
a work chamber (8), wherein the cutting segment (7) is movable along the guiding chamber (5) and the work chamber (8), and wherein a diameter of the first chamber (3) is greater than a diameter of the guiding chamber (5), and wherein the diameter of the guiding chamber (5) is greater than a diameter of the work chamber (8).

7. The belt cutter according to claim 6 wherein the first chamber (3), the guiding chamber (5), and the work chamber (8) constitute a central elongated opening (2) in the elongated housing (1), and wherein the sum of lengths of the first chamber (3), the guiding chamber (5) and the work chamber (8) are equal to the length of the central elongated opening (2).

8. The belt cutter according to claim 4 further comprising a ring (10), wherein the pressure generator (4) is disposed fixed in a first chamber (3) with the ring (10), a circlip ring or an O-ring, and protected with a plug (12) closing a rear end of the elongated housing (1) and equipped with a cylindrical protrusion (11) fitting the rear end of the first chamber (3).

9. The belt cutter according to claim 4 further comprising a first sealing ring (15), wherein the pusher (6) has a first annular sealing groove with the first sealing ring (15).

10. The belt cutter according to claim 4 further comprising
a guiding chamber (5) equipped with a second sealing ring (17) placed at a stop face (22) separating the guiding chamber (5) from a work chamber (8);
a third sealing ring (23), wherein the mandrel (7a) of the cutting segment (7) is equipped with the third sealing ring (23).

11. The belt cutter according to claim 4, wherein the pusher (6) and the cutting segment (7) are in a retracted position adjacent to the pressure generator (4) prior to activation of the pressure generator (4);
wherein a front end of the elongate housing (1) is closed with a cover (13) with a cylindrical protrusion (14) fitting a front end of a work chamber (8).

12. The belt cutter according to claim 4, wherein a length (L) of the cutting segment (7) is greater than a length (L1) of a work chamber (8);
wherein an angle between a tangent to the cutting edge (21) and a central axis of the mandrel (7a) is between 0 and 90 degrees.

13. The belt cutter according to claim 4, wherein an angle between a tangent to the cutting edge (21) and a central axis of the mandrel (7a) is between 90 and 180 degrees;
wherein the pressure generator (4) is an explosive charge generator or a gas generator.

14. A belt cutter for emergency automatic cutting off the seatbelts in vehicles, comprising an elongate housing (1) with a pressure generator (4) connected to an activating system, a blade (9) with a cutting edge (21) fixed in a mandrel (7a) of a cutting segment (7) and movable along a blade slot (19) in the elongate housing (1), a pusher (6) placed between the pressure generator (4) and the cutting segment (7), and a belt slot (18) in the elongate housing (1), characterized in that a central axis common to the elongate housing (1), the pusher (6) and the mandrel (7a) of the cutting segment (7) is parallel to a plane of the blade slot (19), and to a plane of the belt slot (18), and in that the blade slot (19) and the belt slot (18) intersect along a cutting line.

15. The belt cutter according to claim 14, characterized in that the plane of the blade slot (19) is perpendicular to the plane of the belt slot (18).

16. The belt cutter according to claim 14, characterized in that the pressure generator (4) is fixed in a first chamber (3) of the elongate housing (1), the pusher (6) is movable along a second chamber (5) of the elongate housing (1), the cutting segment (7) is movable along the second chamber (5) and a third chamber (8) of the elongate housing (1), and in that the diameter of the first chamber (3) is greater than the diameter of the second chamber (5) which is greater than the diameter of the third chamber (8).

17. The belt cutter according to claim 14, characterized in that a first chamber (3), a second chamber (5), and a third chamber (8) constitute a central elongate opening (2) in the elongate housing (1), and in that the sum of lengths of these first, second and third chambers are equal to the length of the central elongated opening (2).

18. The belt cutter according to claim 14, characterized in that the pressure generator (4) is fixed in a first chamber (3) with a ring (10) circlip or an o-ring, and protected with a rear cap (12) closing the rear end of the elongate housing (1) and equipped with a rear cap protrusion (11) fitting the rear end of the first chamber (3).

19. The belt cutter according to claim 14, characterized in that the pusher (6) has a first annular sealing groove with a first sealing ring (15).

20. The belt cutter according to claim 14, characterized in that a second chamber (5) is equipped with a second sealing ring (17) placed at a stop face (22) separating the second chamber (5) from a third chamber (8).

\* \* \* \* \*